C. H. TRUE.
METHOD OF MAKING HEATING OR COOLING UNITS.
APPLICATION FILED APR. 10, 1917.
1,264,455. Patented Apr. 30, 1918.
4 SHEETS—SHEET 1.
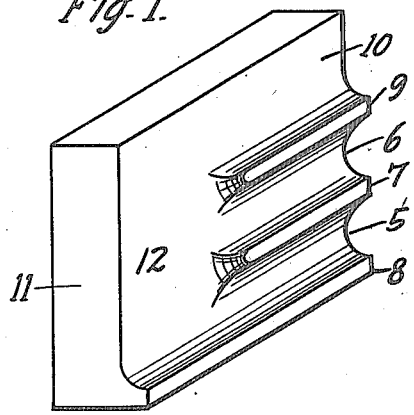
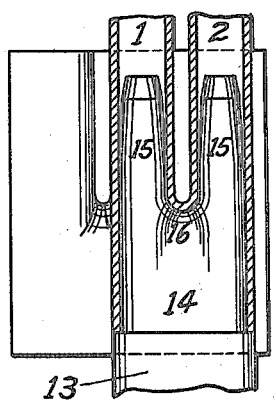
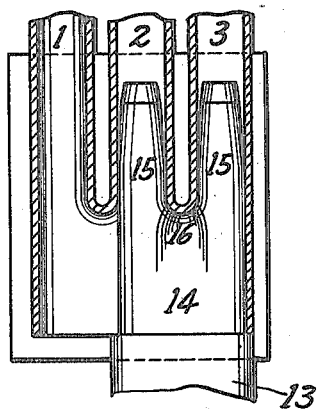
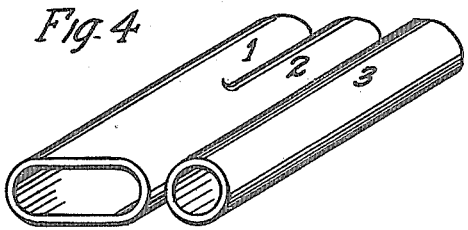
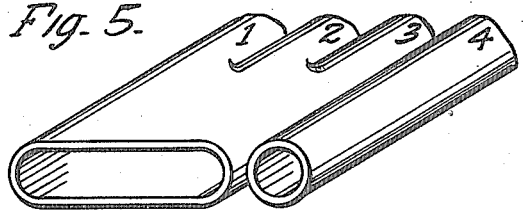
Charles H. True Inventor
By his Attorney O. V. Thiele

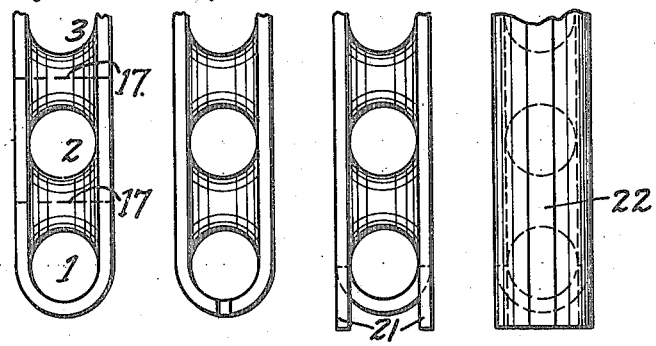
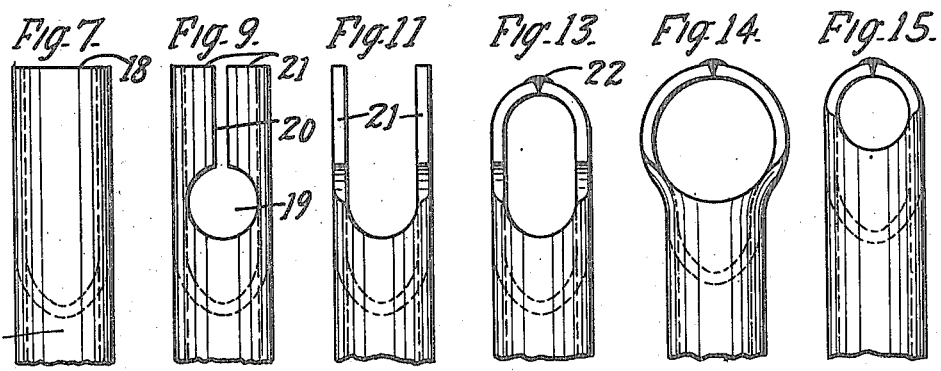
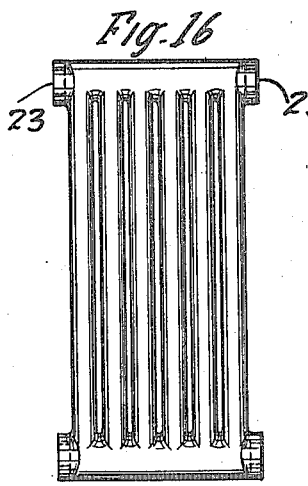
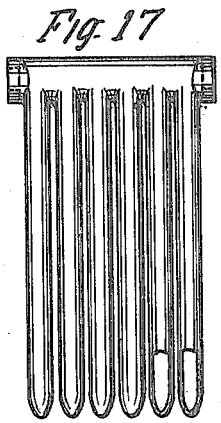
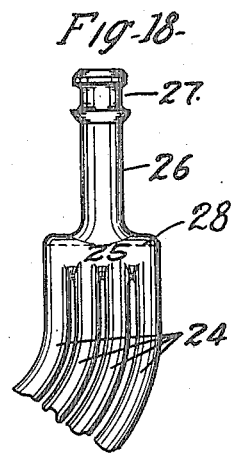

UNITED STATES PATENT OFFICE.

CHARLES H. TRUE, OF HAMMOND, INDIANA, ASSIGNOR TO LOCOMOTIVE SUPERHEATER COMPANY, OF NEW YORK, N. Y., A CORPORATION OF DELAWARE.

METHOD OF MAKING HEATING OR COOLING UNITS.

1,264,455.      Specification of Letters Patent.      Patented Apr. 30, 1918.

Application filed April 10, 1917. Serial No. 161,011.

*To all whom it may concern:*

Be it known that I, CHARLES H. TRUE, a citizen of the United States, and resident of Hammond, Indiana, have invented a certain new and useful Improvement in Methods of Making Heating or Cooling Units, of which the following is a specification.

My invention relates to structures of the class referred to in which a plurality of parallel pipes is connected to a common header or common headers, and has for its object the production of improved structures of this kind and the provision of a method and means of producing them.

Figure 19:
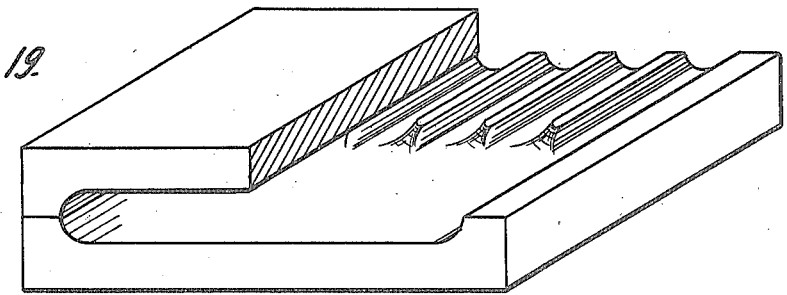
Figure 20:
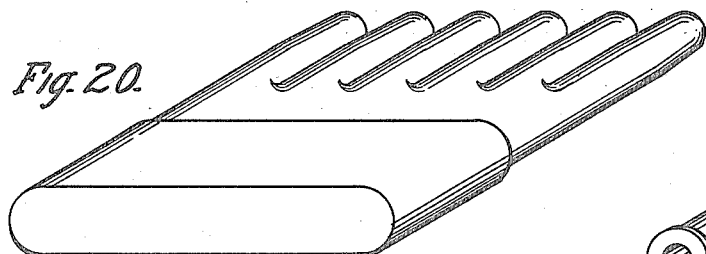
Figure 22:
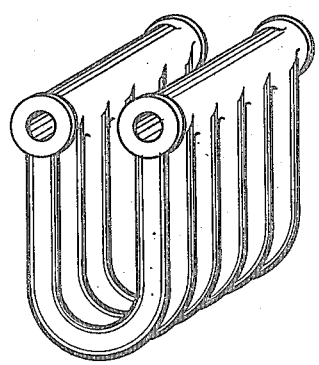
Figure 21:
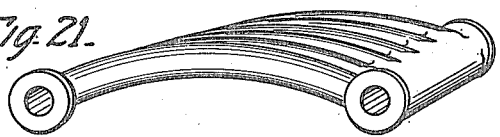

The invention will be readily understood from the following description which is to be read in connection with the drawings forming part hereof. In the drawings, Figure 1 is a projection of one half of the female die used in the present method; Fig. 2 is a plan view of the same showing in addition the male die at the end of its inward stroke and two pipes, on which it has just operated, in section; Fig. 3 is a similar view with a third pipe connected to the second; Figs. 4 and 5 are perspective views showing steps in the process; Figs. 6 to 13 illustrate succeeding steps in the process; Figs. 14 and 15 show modifications in the header or manifold; Fig. 16 shows a completed unit made by this process; Fig. 17 shows another form of unit, completed; Fig. 18 shows the process applied to a smoke tube superheater; Figs. 19 and 20 show a modified form of the apparatus used; while Figs. 21 to 28 show still different forms of units made by the process.

In United States Patent 1,169,209, granted jointly to myself and Neal T. McKee, there is disclosed a method of making a return bend, which has come into extensive use. The first part of that process results in a structure comprising two pipe ends joined by means of a short bridging channel formed of portions of the pipe walls themselves. The pipes and channel are at this stage still open at their ends. Briefly stated, the structure referred to is made by clamping the two pipes, properly heated, in position in the peculiarly shaped female die and then forcing home the male die which in its travel splits the neighboring pipe walls, spreads the split portions, and welds the edges of one to the edges of the other.

The present invention is an extension and additional application of the principle involved in the patent referred to.

In Fig. 1 is shown one of the two symmetrical halves of the female die used in the present process. It will be seen that it has two semi-cylindrical grooves, 5 and 6, separated by a wall 7. Separated from one of these grooves by wall 9 is the clearance space 10. Wall 9 is identical in shape with wall 7. These two walls do not extend entirely to the end 11 of the die, but terminate some distance short of it, merging gradually from their greatest height to the surface 12, which is continuous with bottom of grooves 5 and 6 the bottom of clearance space 10. The wall 8, forming the outer side of groove 5, extends the entire length of the die, as is clearly shown in the figure.

As has been stated, the other half of the female die is symmetrical with the one just described. When the two are placed together there will therefore be formed two cylindrical bores and an opensided channel or clearance space, all in line, and connected with each other for a certain distance from one end.

The male die 13 comprises a body portion 14, and two legs 15—15 connected by a web 16. It conforms generally in shape to the portion of the female die with which it coöperates, but is smaller, so that when inserted in the female die it is spaced everywhere from its walls by an amount approximately equal to the thickness of the pipes.

Figs. 4 and 5 illustrate what is to be accomplished by the die just described. Pipes 1 and 2 are first joined by one operation. To do this, the two pipes are first suitably heated, are then clamped between the two halves of the female die in a position which will be apparent from Fig. 2, whereupon the male die is by suitable mechanism caused to perform its inward stroke. In doing so, it splits the two neighboring pipe walls, spreading the portions adjacent to each side and to the bottom of the slits outward. The conformation and relative positions of the male and female dies are such that the edges of the spread portions come together with just the right amount of pressure to form a good weld. The male die then performs its outward stroke. This entire operation, it is again pointed out, is well-known, and no claims are herein made to it except as it forms a part of the process forming the subject of the present invention.

After pipes 1 and 2 have been joined as just described, pipe 3 is to be joined to them in the relative position indicated, whereafter pipe 4 is to be joined to pipe 3. Any desired number of pipes may evidently be added. In Fig. 2 the first two pipes are shown, in section, the operation of joining them having been completed. When die 13 has been withdrawn, the joined pipes are moved to position of Fig. 3, pipe 3 is placed in the position indicated in the same figure, and joined as shown. It is understood of course that the parts to be operated on are first suitably heated in each case. The desired number of pipes having been joined as described, the resulting structure may be represented as in Figs. 6 and 7, where parts are broken away. Fig. 6 is a top view, showing the several pipes 1, 2, 3, etc., the lines along which they have been joined being indicated by dotted lines 17—17. It now remains to close the top 18 of the header that has been formed, and to provide suitable connecting means for it.

To close the top 18 I prefer to proceed as follows: First I make an opening 19 at each end of the header, and sever the end wall above it, as indicated at 20. Then I bend the wings 21 outward into the position shown in Figs. 10 and 11. Next the upper portions of the walls are bent together, and welded as at 22 by an oxyacetylene flame or any other preferred means. In bending the walls as just stated it is found advantageous to place a bar of the proper shape into the open header. This bar is removed when the bending has been accomplished. It will be evident that while the header is shown more or less elongated or elliptical in cross-section in Figs. 12 and 13, it may be given some other preferred shape, e. g., circular in cross-section as in Figs. 14 and 15.

Finally the opening at each end is given the necessary shape and a suitable boss 23 is built or welded on to be tapped out or otherwise prepared for connection. The specific manner of doing this does not form part of the present invention.

I have described above the method of forming a header or manifold at one end of the pipes. It is evident that the same steps can be repeated at the other end, giving us a structure such as shown in Fig. 16. On the other hand the present invention is not confined to such structures with a header at either end, but is equally applicable to cases where only the first ends are to be joined. Thus in Fig. 17 is shown a case where the pipes are joined to one header only, the opposite ends being closed.

Another application of the present invention is illustrated in Fig. 18. Here reference numeral 24 designates one set of ends of several units such as used in smoke tube superheaters. They are seen to be connected to a common header in making which the present method may be employed. The ends are first united by means of the die above described after which the head 26 with the usual enlargement 27 and a base shaped to correspond to the header, is welded on along the line 28 by any desired process. Manifestly the connection into the header may also be provided in some other way.

Many other applications will occur in practice.

The method thus far described confines itself to the production of one weld at a time. As a matter of fact more than one weld can be produced simultaneously. The preferred form of apparatus for doing this is illustrated in Figs. 19 and 20. There are here as many places in the female die for pipes as it is desired to weld pipes at one operation, the male die corresponding in shape, and of course being made with the required clearance. The pipe ends are heated, placed in position, clamped; the male die performs its stroke, and the header is complete to the stage shown in Figs. 6 and 7, the remaining operations being performed as before.

The pipes treated by the present process need not be straight throughout. It is sufficient if the end portions into which the male die penetrates are straight. The main portions of the pipes may have a number of desired forms. Thus they may be curved to give resulting structures shown in Figs. 21, 22, 23, and 25. No additional description is required to show how these are made.

Figure 24:
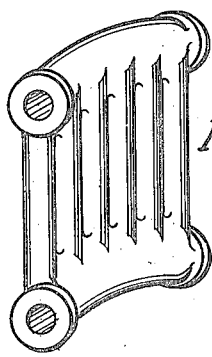
Figure 23:
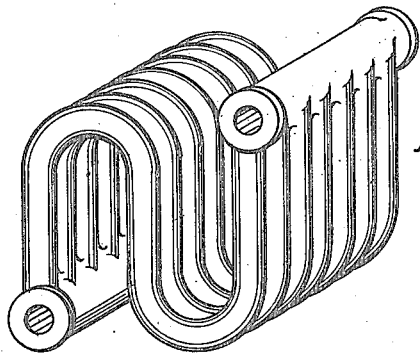
Figure 25:
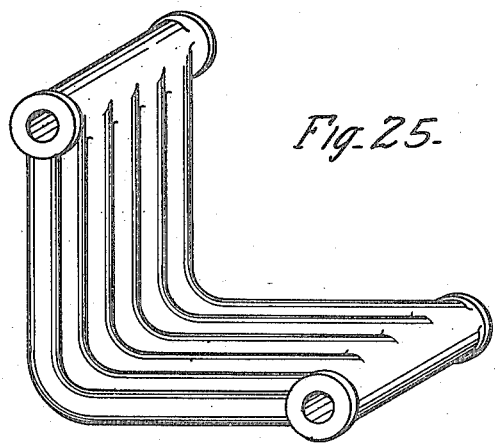

Instead of making the headers straight I can give them a curved form, as in Fig. 24. This is accomplished by having the space which accommodates the second one of the pipes already joined out of line with the two bores holding the pipes about to be joined. The process is the same as above, but the bar used in closing the header must of course be of the proper curved form.

Figure 26:
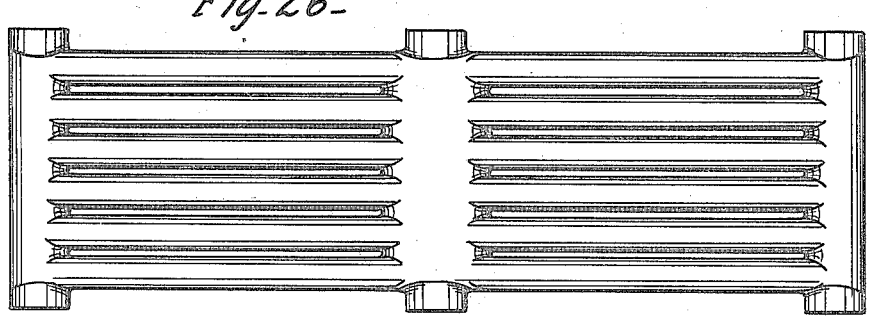
Figure 27:
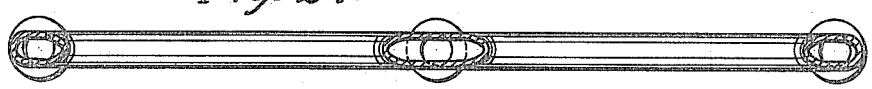
Figure 28:
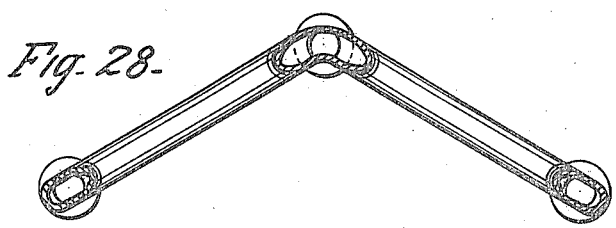

In the form of the finished product shown in Figs. 26 and 27 headers are first produced at the ends of two separate sets of pipes; only one header on each set is closed, the other two headers being welded edge to edge, after which the usual provision for connections is made. Instead of being placed at 180°, the two sections may also be placed at some other angle as shown in Fig. 28, by trimming the edges of the central headers appropriately before welding them together.

What I claim is:

1. The process of forming headers on sets of pipes which comprises slitting those walls of the pipes, which are to lie opposite each other in the finished product, longitudinally for a suitable distance from one end; pressing the portions adjacent to each side and to the bottom of said slits outwardly; welding the edges of said portions of one pipe to those of another; closing the open end of the resulting structure, thus forming a header; and providing an opening for connections to the header.

2. The process of forming headers on sets of pipes which comprises joining the ends of two of the pipes by the steps of heating them, slitting them for a suitable distance from their ends, pressing the portions adjacent to each side and to the bottom of the slits outwardly, welding the said edges of one to the corresponding edges of the other; joining in a similar manner a third pipe to one of the first two; closing the open end of the resulting structure, thus forming a header; and providing an opening for connections to the header.

3. The process of forming headers on a set of parallel pipes comprising first, joining the ends of two suitably heated pipes by the simultaneous steps of slitting them for a suitable distance from their ends, pressing the portions adjacent to each side and to the bottom of said slits outwardly, and welding the said edges of one to the corresponding edges of the other; next joining a third pipe in a similar manner to the first two, and repeating these steps for as many additional pipes as desired; then closing the open end of the resulting structure and supplying a connection into the header so formed; and finally repeating these steps for the other ends of the pipes.

CHARLES H. TRUE.